United States Patent
Leconte

(10) Patent No.: US 10,677,913 B2
(45) Date of Patent: * Jun. 9, 2020

(54) METHOD FOR DETERMINING A DISTANCE BETWEEN A VEHICLE AND A VEHICLE ACCESS AND STARTER IDENTIFIER

(71) Applicant: VALEO COMFORT AND DRIVING ASSISTANCE, Créteil (FR)

(72) Inventor: Eric Leconte, Creteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 171 days.

This patent is subject to a terminal disclaimer.

(21) Appl. No.: 15/756,166

(22) PCT Filed: Aug. 31, 2016

(86) PCT No.: PCT/EP2016/070546
§ 371 (c)(1),
(2) Date: Feb. 28, 2018

(87) PCT Pub. No.: WO2017/037133
PCT Pub. Date: Mar. 9, 2017

(65) Prior Publication Data
US 2018/0246199 A1     Aug. 30, 2018

(30) Foreign Application Priority Data
Aug. 31, 2015 (FR) .................................... 15 58086

(51) Int. Cl.
*G01S 13/84*     (2006.01)
*G01S 13/82*     (2006.01)
(Continued)

(52) U.S. Cl.
CPC .............. *G01S 13/84* (2013.01); *B60R 25/04* (2013.01); *B60R 25/24* (2013.01); *G01S 13/825* (2013.01);
(Continued)

(58) Field of Classification Search
CPC ......... G01S 13/75; G01S 13/825; G01S 13/84
See application file for complete search history.

(56) References Cited

U.S. PATENT DOCUMENTS 4,577,150 A * 3/1986 Schreuder ............... G01S 13/84
                                                324/76.77
4,804,961 A * 2/1989 Hane ....................... G01S 13/84
                                                342/125

(Continued)

FOREIGN PATENT DOCUMENTS

FR     2 981 026 A1    4/2013

OTHER PUBLICATIONS

International Search Report of the International Searching Authority issued in PCT/EP2016/070546 dated Nov. 14, 2016 (2 pages).

(Continued)

*Primary Examiner* — Peter M Bythrow
(74) *Attorney, Agent, or Firm* — Osha Liang LLP

(57) ABSTRACT

The invention relates to a method (METH) for measuring a distance R between a vehicle (V) and an identifier (I) for accessing and starting the vehicle (V), the vehicle (V) and the identifier (I) being synthronised. The method (METH) comprises the following steps: —selecting (Sel_$f_p$) N frequencies $f_p$, p∈[1;N], N being a natural number at least higher than 3; —implementing N sequences $Sq_p$, each sequence $Sq_p$ comprising the following steps: •transmitting (Em_$S_{vp}$) a first signal ($S_{vp}$) of frequency $f_p$ from an emitter (TXv) of the vehicle (V) to a receiver (Rxi) of the identifier (I); •measuring (Mes_$\phi_{vip}$) with a calculator (Xi) of the (Continued)

identifier (I) a phase $\phi_{vip}$, modulo $2\pi$, of the first signal ($S_{vp}$) received, relative to a second signal ($S_{ip}$) of phase $\phi_{ip}(t)=\phi_{0ip}+2\pi f_p t$; •transmitting (Em_$S_{ip}$) the second signal ($S_{ip}$) from an emitter (TXi) of the identifier (I) to a receiver (RXv) of the vehicle (V); •calculating (Mes_$\phi_{ivp}$) with a calculator (Xv) of the vehicle (V) a phase $\phi_{ivp}$, modulo $2\pi$, of the second signal ($S_{ip}$) received, relative to the first signal ($S_{vp}$); •calculating (Cal_$\phi_p$) the average $\phi_p$ of the phase $\phi_{vip}$ and of the phase $\phi_{ivp}$; —for each p between 1 and N−1, calculating (Cal_$P_p$) a ramp $P_p$ using the formula $P_p=(\phi_{p+1}-\phi_p)/(f_{p+1}-f_p)$; and—calculating (Cal_R) distance R front the ramps $P_p$, p∈[1;N].

6 Claims, 4 Drawing Sheets

(51) Int. Cl.
   *B60R 25/24* (2013.01)
   *G07C 9/00* (2020.01)
   *B60R 25/04* (2013.01)

(52) U.S. Cl.
   CPC .... *G07C 9/00309* (2013.01); *B60R 2325/101* (2013.01); *B60R 2325/103* (2013.01); *G07C 2209/63* (2013.01)

(56) References Cited

U.S. PATENT DOCUMENTS

| | | | |
|---|---|---|---|
| 4,851,851 A | * | 7/1989 | Hane .............. G01S 13/38 342/112 |
| 2002/0094786 A1 | * | 7/2002 | Berliner .......... G01S 13/84 455/67.16 |
| 2003/0090365 A1 | * | 5/2003 | Bergerhoff ...... B60R 25/20 340/5.61 |
| 2005/0038574 A1 | * | 2/2005 | Gila ............... G01S 13/84 701/2 |
| 2010/0167661 A1 | * | 7/2010 | Kluge ............. G01S 13/84 455/67.16 |
| 2010/0231410 A1 | * | 9/2010 | Seisenberger ... G01S 13/74 340/8.1 |
| 2013/0201003 A1 | * | 8/2013 | Sabesan .......... G01S 7/42 340/10.1 |
| 2014/0015546 A1 | * | 1/2014 | Frederick ........ G01B 7/14 324/642 |

OTHER PUBLICATIONS

Written Opinion of the International Searching Authority issued in PCT/EP2016/070546 dated Nov. 14, 2016 (7 pages).

\* cited by examiner

METHOD FOR DETERMINING A DISTANCE BETWEEN A VEHICLE AND A VEHICLE ACCESS AND STARTER IDENTIFIER

TECHNICAL FIELD OF THE INVENTION

The technical field of the invention is, in general, hands-free access and starting systems for vehicles. The invention relates more particularly to a method for determining a distance separating a vehicle from a hands-free identifier that makes it possible to access the vehicle and/or to start the vehicle.

PRIOR ART

What are termed "hands-free" access and starting systems, allowing the doors of a vehicle to be locked and unlocked and the vehicle engine to be started without the use of a traditional key, are nowadays widespread on the market.

Conventionally, when a user wishing to unlock a door of a vehicle touches a capacitive sensor or is detected by an infrared sensor situated on the door handle, a central computer of the vehicle triggers the transmission of a low-frequency (between 20 and 150 kHz) interrogation signal by a low-frequency antenna of the vehicle. As an alternative, the low-frequency antenna may send such low-frequency interrogation signals periodically (reference is made to "polling"). If an identifier (which conventionally takes the form of a key or an electronic card, or even a smartphone having a suitable activated application) in the proximity of the vehicle captures an interrogation signal, it responds by sending an unlocking code to the central computer by radio signal. A radio receiver of the vehicle then receives the radio signal: if the locking code is recognized by the central computer, then the latter orders the unlocking of the door.

The method is substantially the same when the user wishes to start the vehicle and presses a switch situated in the passenger compartment: in this case, the engine is started by the central computer only if a starting code sent by the identifier is recognized by the central computer.

To increase the security of hands-free access and starting systems, it is desirable for additional conditions to be met before locking, unlocking or starting is triggered. It is desirable in particular for the location of the identifier to be in keeping with the action to be performed, for example:

For unlocking, the identifier should be located within a maximum perimeter, for example of 2 meters, around the vehicle For locking, there should be no identifier located inside the passenger compartment For starting, the identifier should be located inside the passenger compartment.

Thus, a reliable measurement of distance between the identifier and the vehicle is necessary.

Generally, the distance is calculated on the basis of a measurement of power (which measurement is called RSSI for "Received Signal Strength Indication") of a low-frequency signal received by the identifier, for example the interrogation signal. Using a low-frequency signal to measure the distance is advantageous. Specifically, the vehicle-identifier distance of an identifier in the proximity of the vehicle is far shorter than the wavelength of the low-frequency signal. Refraction phenomena are thus limited. In addition, modern low-frequency receivers have a very low consumption in standby mode.

The identifier is able for example to measure the power and then transfer the measurement by radio signal to the radio receiver of the vehicle, the central computer then taking on the task of measuring the distance separating the vehicle from the identifier. As an alternative, the identifier may itself calculate the distance and respond to the interrogation signal only if this distance is shorter than a predetermined threshold (or else respond that the calculated distance does not meet a security condition).

However, it is common for the measurement to be disturbed by signals transmitted by nearby equipment interfering with the low-frequency signal.

GENERAL DESCRIPTION OF THE INVENTION

The aim of the invention is therefore to propose a method for measuring distance between a vehicle and an identifier, which method is less sensitive to the disturbances from signals transmitted by nearby equipment.

To this end, the invention proposes a method for measuring a distance R separating a vehicle and an identifier for accessing and starting the vehicle, the vehicle and the identifier being synchronized, the method comprising:

selecting N frequencies $f_p$, $p \in [1;N]$, N being a natural number at least greater than 3 implementing N sequences $Sq_p$, each sequence $Sq_p$ comprising the following steps:

transmission, from a transmitter of the vehicle to a receiver of the identifier, of a first signal of frequency $f_p$ measurement, by a computer of the identifier, of a phase $\varphi_{vip}$, modulo $2\pi$, of the received first signal, in relation to a second signal of phase $\varphi_{ip}(t)=\varphi_{0ip}+2\pi f_p t$ transmission, from a transmitter of the identifier to a receiver of the vehicle, of the second signal calculation, by a computer of the vehicle, of a phase $\varphi_{ivp}$, modulo $2\pi$, of the received second signal, in relation to the first signal calculation (Cal_$\varphi_p$) of the average $\varphi_p$ of the phase $\varphi_{vip}$ and of the phase $\varphi_{ivp}$ for each value of p between 1 and N−1, calculation of a gradient $P_p$ using the formula $P_p=(\varphi_{p+1}\varphi_p)/(f_{p+1}-f_p)$ calculation of the distance R on the basis of the gradients $P_p$, $p \in [1;N]$.

The term "synchronized" is understood to mean being able to implement the method.

According to the invention, a plurality of first signals and second signals are exchanged between the vehicle and the identifier. More precisely, N outward-return trips (an outward trip corresponding to a transmission of a first signal from the vehicle to the identifier, a return trip corresponding to a transmission of a second signal from the identifier to the vehicle) are performed. An average phase $\varphi_p$ is associated with each outward-return trip, each pair of average phases $(\varphi_p, \varphi_{p+1})$ making it possible to calculate a gradient $P_p$. The gradients $P_p$ are then used to calculate the distance R.

It is noted that the frequencies of the signals exchanged between the vehicle and the identifier are selected. This makes it possible to reduce the risks of interference between the exchanged signals and disturbing signals transmitted by nearby equipment, by selecting frequencies that are remote from the conventional transmission frequencies of this nearby equipment. The disturbing frequencies are for example the center frequencies of Bluetooth or Wi-Fi channels.

Besides the features that have just been outlined in the previous paragraph, the method according to the invention may have one or more additional features from among the following, which are considered individually or in any technically feasible combination:

the frequencies $f_p$ are selected, during the selection step, from among a plurality of frequencies $F_j$, j∈[1;K], K being a natural number at least greater than 3, that are not situated at the center of a plurality of predetermined communication channels.

the frequencies $F_j$ are edge frequencies of first channels of the plurality of predetermined communication channels.

the frequencies $F_j$ are such that K=40, F1=2401 MHz and, for all values of j between 1 and 39, $F_{j+1}-F_j$=2 MHz.

the frequencies $F_j$ are situated outside of second channels of the plurality of predetermined communication channels.

the second channels are Wi-Fi channels.

The invention and its various applications will be better understood upon reading the following description and upon examining the figures accompanying it.

BRIEF DESCRIPTION OF THE FIGURES

The figures are presented only by way of entirely non-limiting indication of the invention. In the figures.

DETAILED DESCRIPTION OF AT LEAST ONE EMBODIMENT OF THE INVENTION

Unless indicated otherwise, one and the same element appearing in different figures has a single reference.

The method described hereinafter makes it possible to calculate a distance R between a vehicle V and what is termed a hands-free identifier I, said identifier I making it possible to control, using a "hands-free" principle, access to or starting of the vehicle V. The identifier I is for example an electronic key or card, or a smartphone having a suitable application.

The vehicle V includes a first transceiver device Dv, and the identifier I includes a second transceiver device Di. As the first transceiver device Dv and the second transceiver device Di are similar, a general description is given hereinafter.

Figure 1:
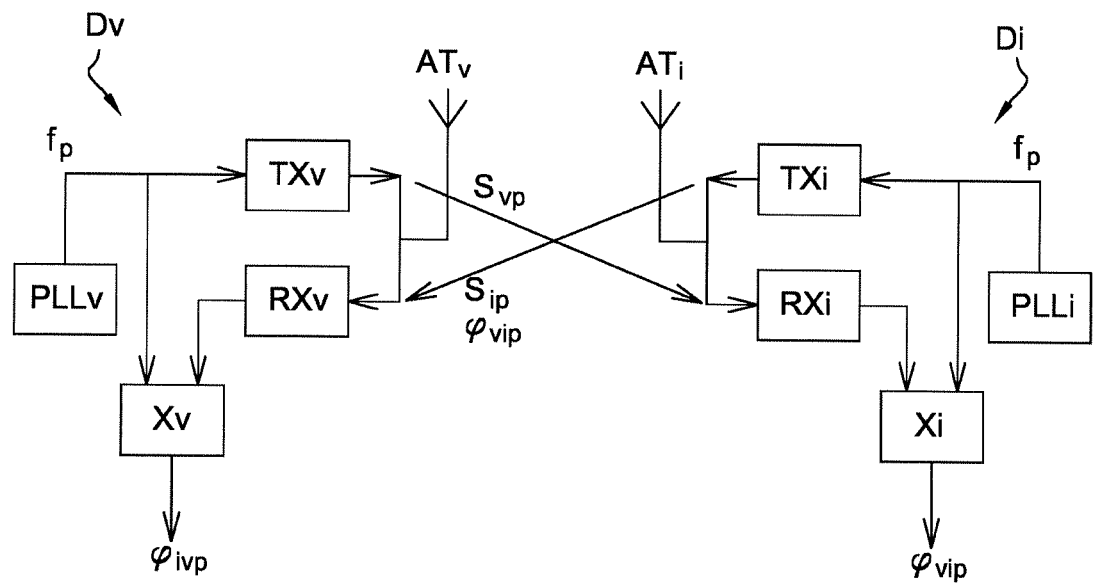
FIG. 1 shows two transceiver devices belonging to a vehicle and an identifier, respectively, between which it is desired to know the distance, the devices being designed to implement a method according to one embodiment of the invention.

With reference to FIG. 1, a transceiver device Dz, the index z indiscriminately being v or i, includes:

a transmitter TXz of radio signals (with a frequency at least equal to 1 GHz)

a receiver RXz of radio signals (with a frequency at least equal to 1 GHz)

an antenna Atz to which the transmitter TXz and the receiver RXz are connected a phase-locked loop PLLz for supplying signals of various frequencies to the transmitter TXz and to a computer Xv the computer Xz for calculating the phases of signals received by the receiver RXz in relation to signals supplied by the phase-locked loop PLLz.

It is noted that a smartphone natively has all of the components of the described transceiver device Di. In one preferred embodiment, the identifier I is therefore a smartphone having a suitable application for the hands-free accessing and starting of the vehicle. The various components of the transceiver device Di are advantageously triggered and controlled by the application installed on the smartphone.

The method according to the invention is implemented by the first transceiver device Dv and the second transceiver device Di. It is noted that the first transceiver device Dv and the second transceiver device Di have been synchronized with one another beforehand, for example via a Bluetooth Low Energy protocol (it is noted that a smartphone natively has a Bluetooth chip).

Figure 2:
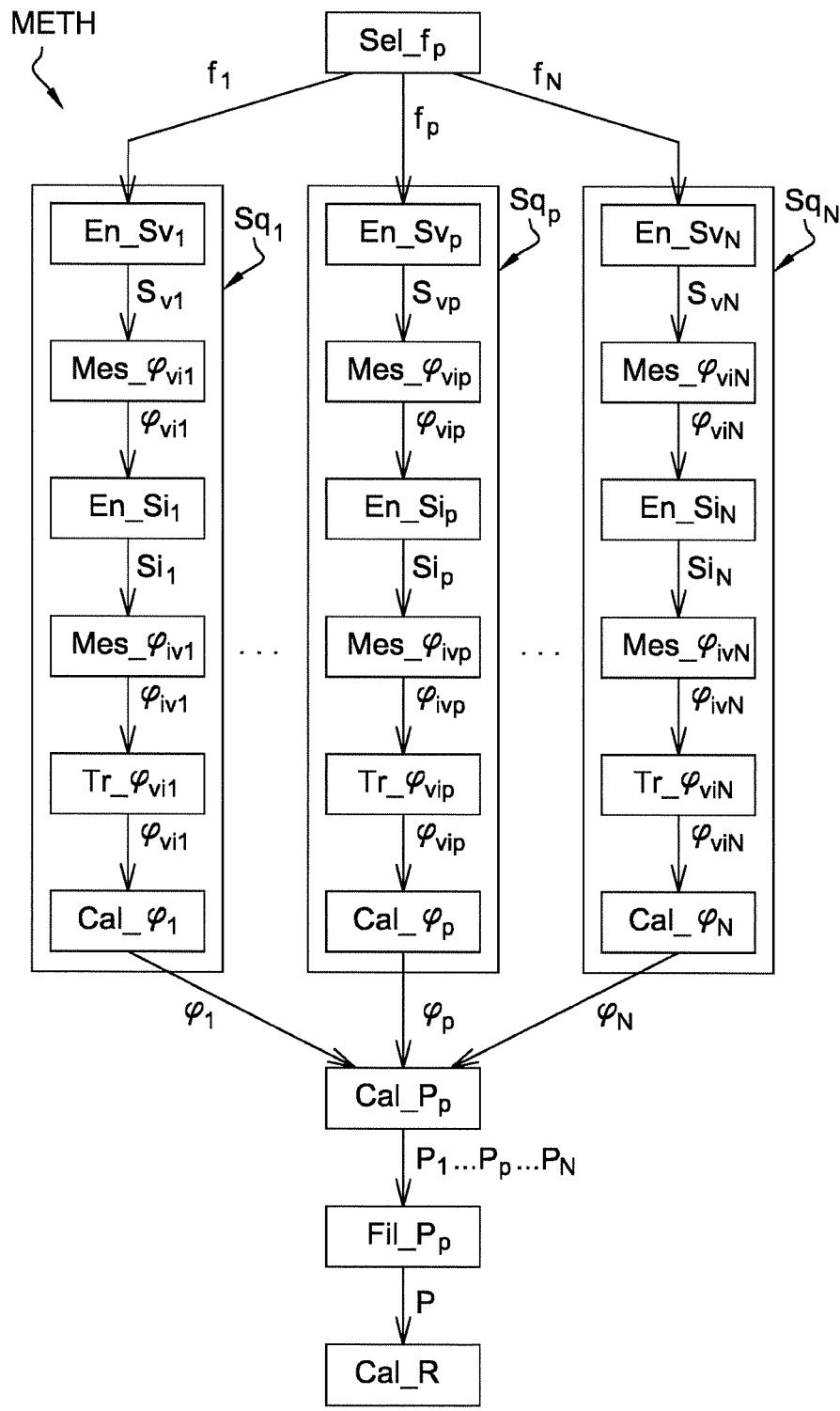
FIG. 2 shows a block diagram showing steps of the method.

With reference to FIG. 2, the method METH first of all includes selecting frequencies p∈[1;N], N being a natural number at least greater than 3, that are remote from conventional disturbing frequencies. The conventional disturbing frequencies are for example Bluetooth frequencies or Wi-Fi frequencies.

Figure 3:
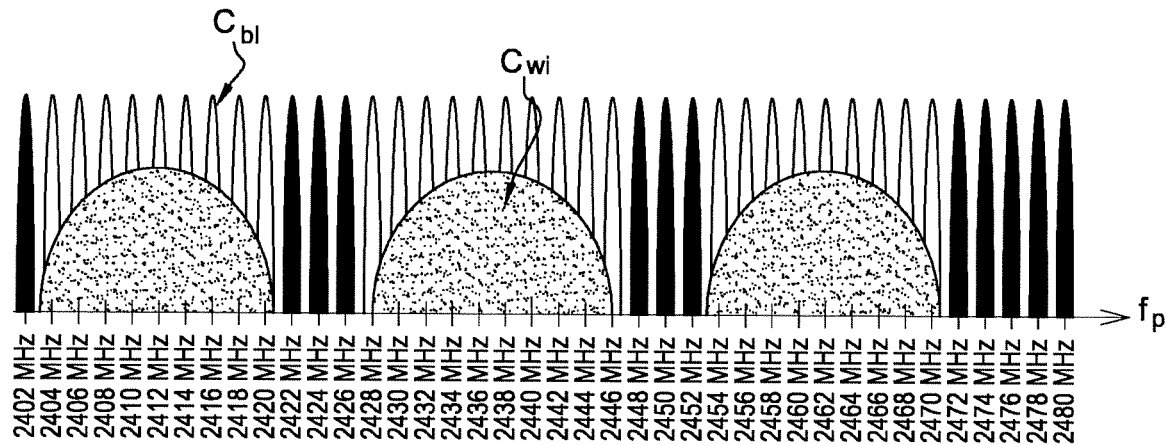
FIG. 3 shows a schematic depiction of communication channels comprising frequencies disturbing the distance measurement.

FIG. 3 illustrates 40 Bluetooth channels $C_{bl}$ and 3 Wi-Fi channels $C_{wi}$ situated between 2401 and 2481 MHz. The Bluetooth channels $C_{bl}$ have a width of 2 MHz, centered on even frequencies: the first Bluetooth channel is centered on the frequency 2402 MHz, and the last is centered on the frequency 2480 MHz. The Wi-Fi channels have a width of 18 MHz. The left-hand Wi-Fi channel corresponds to the channel 1, and is centered on the frequency 2412 MHz; the middle Wi-Fi channel corresponds to the channel 6, and is centered on the frequency 2437 MHz; the right-hand Wi-Fi channel corresponds to the channel 11, and is centered on the frequency 2462 MHz.

In a channel, the center frequencies are those that are used by most equipment, whereas the edge frequencies are less frequently used. Thus, in one preferred embodiment, the frequencies $f_p$ are selected from among frequencies $F_j$, j∈[1;K] that are situated:

at the edges of the Bluetooth channels $C_{bl}$, and/or at the edges or outside of the Wi-Fi channels $C_{wi}$.

The frequencies $F_j$ at the edges of the Bluetooth channels $C_{bl}$ are such that K=40, F1=2401 MHz and, for all values of j between 1 and 39, $F_{j+1}-F_j$=2 MHz. This therefore involves frequencies of 2401 MHz, 2403 MHz, etc. The frequencies $F_j$ at the edges or outside of the Wi-Fi channels $C_{wi}$ are situated between 2401 and 2403 MHz, between 2421 and 2428 MHz, between 2446 and 2453 MHz, and between 2471 and 2481 MHz.

After selecting N frequencies $f_p$ at the edges of the Bluetooth channels $C_{bl}$ and/or at the edges or outside of the Wi-Fi channels $C_{wi}$, the method METH includes a succession of N sequences $Sq_p$, each sequence $Sq_p$ comprising the following steps.

In a first step $Em\_S_{vp}$ of a sequence $Sq_p$, at a time $t_{0p}$, a first non-modulated signal $S_{vp}$ of phase $\varphi_{0vp}$ and of frequency $f_p$ and generated beforehand by the phase-locked loop PLLv of the vehicle V, is transmitted by the transmitter TXv of the vehicle V. The first signal $S_{vp}$ is received by the receiver RXi of the identifier I at a time $t_{0p}+\Delta t=t_{0p}+R/c$, where c is the propagation speed of the signal and R is the distance separating the vehicle V from the identifier I.

In a second step Mes_$\varphi_{vip}$ of a sequence $Sq_p$, the computer Xi of the identifier I measures the phase $\varphi_{vip}$, modulo $2\pi$, of the received first signal $S_{vp}$, in relation to a second signal $S_{ip}$. The second signal $S_{ip}$ is a signal generated by the phase-locked loop PLLi of the identifier I, such that its phase has a value of $\varphi_{0ip}$ and its frequency $f_p$.

The measured phase $\varphi_{vip}$ is able to be calculated using the following formula:

$$\varphi_{vip}+k*2\pi=\varphi_{0vp}+2\pi f_p t_{0p}-\varphi_{0ip}-2\pi f_p(t_{0p}+R/c)$$

k being a positive natural number.

In a third step Em_$S_{ip}$ of a sequence $Sq_p$, at a time $t_{1p}$, the second signal $S_{ip}$ is transmitted by the transmitter TXi of the identifier I. The second signal $S_{ip}$ is received by the receiver RXv of the vehicle V at a time $t_{1p}+\Delta t=t_{1p}+R/c$.

In a fourth step Mes_$\varphi_{ivp}$ of a sequence $Sq_p$, the computer Xv of the vehicle V measures the phase $\varphi_{ivp}$, modulo $2\pi$, of the received second signal $S_{ip}$, in relation to the first signal $S_{vp}$.

The measured phase $\varphi_{ivp}$ is able to be calculated using the following formula:

$$\varphi_{ivp}m*2\pi=\varphi_{0ip}+2\pi f_p t_{1p}-\varphi_{0vp}-2\pi f_p(t_{1p}+R/c)$$

m being a positive natural number.

In a fifth step Tr_$\varphi_{vip}$ of a sequence $Sq_p$, the transmitter TXi of the identifier I transmits, to the receiver RXv of the vehicle V, the phase $\varphi_{vip}$ that it measured previously.

In a sixth step Cal_$\varphi_p$ of a sequence $Sq_p$, a computer of the vehicle V calculates the average $\varphi_p$ of the phase $\varphi_{ivp}$ (measured in the fourth step Mes_$\varphi_{ivp}$) and of the phase $\varphi_{vip}$ (received in the fifth step Tr_$\varphi_{vip}$).

The average phase $\varphi_p$ is calculated using the following formula:

$$\varphi_p = (\varphi_{0vp} + 2\pi f_p t_{0p} - \varphi_{0ip} - 2\pi f_p t_{0p} - 2\pi f_p R/c +$$
$$\varphi_{0ip} + 2\pi f_p t_{1p} - \varphi_{0vp} - 2\pi f_p t_{1p} - 2\pi f_p R/c - k*2\pi - m*2\pi)/2$$
$$= -\{4\pi f_p R/c + (k+m)*2\pi\}/2$$

As an alternative, the sequences $Sq_p$ could not comprise the fifth step, but comprise a step, between the fourth and the sixth step, of transmission, from the transmitter TXv of the vehicle V to the receiver RXi of the identifier I, of the phases $\varphi_{ivp}$ measured previously. The sixth step would thus be implemented by the computer of the identifier I, and not by the computer of the vehicle V.

With reference to FIG. 2, the method METH also includes the following steps, performed following the implementation of the N sequences $Sq_p$.

In a step Cal_$P_p$, for each value of p between 1 and N-1, a gradient $P_p$ is calculated by the computer Xv of the vehicle V using the following formula:

$$P_p(\varphi_{p+1}-\varphi_p)/(f_{p+1}-f_p).$$

It is noted that:

$$P[-\{4\pi f_{p+1}R/c+(k+m)*2\pi\}/2+\{4\pi f_p R/c+(k+m)*2\pi\}/2]/(f_{p+1}-f_p)=-2\pi R/c.$$

Figure 5:
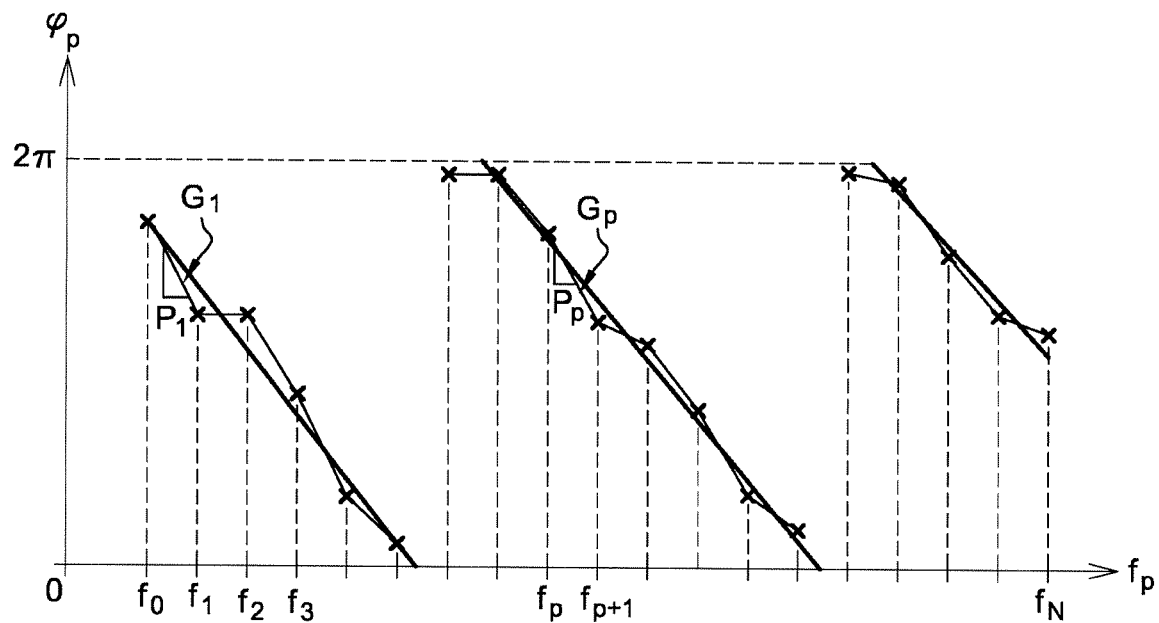
FIG. 5 shows a graph depicting sections of average phases, modulo $2\pi$, calculated during steps of the method, as a function of frequencies of signals exchanged during other steps of the method.

As shown in FIG. 5, which shows the various average phases $\varphi_p$ modulo $2\pi$ (calculated during the sixth steps Cal_$\varphi_p$ of the sequences $Sq_p$) as a function of the various frequencies $f_p$, the gradients $P_p$ correspond to the incline of the segments $G_p$ whose edges are the points with coordinates $(f_p; \varphi_p)$ and $(f_{p+1}; \varphi_{p+1})$.

Figure 4:
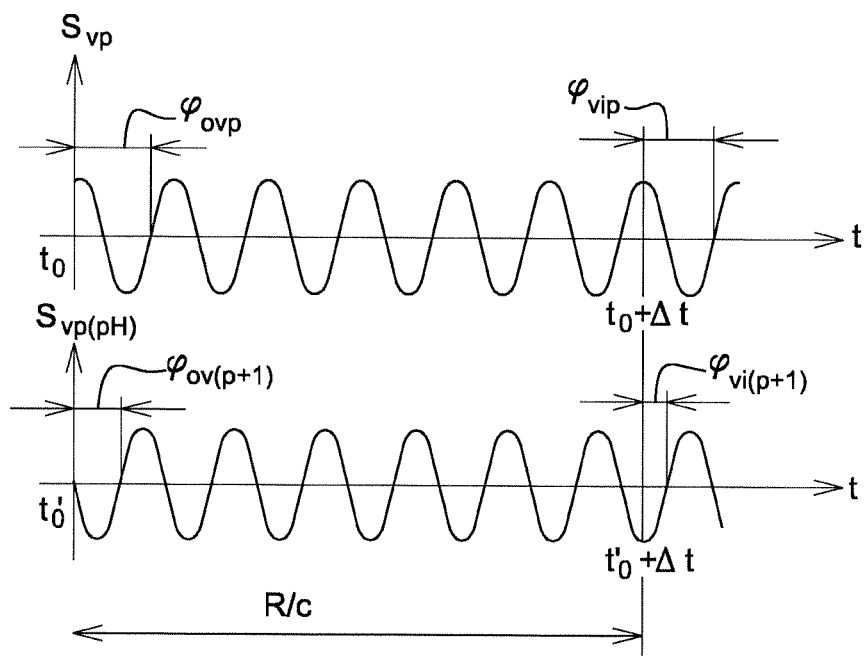
FIG. 4 shows signals exchanged between the transceiver devices during one step of the method.
Figure 6:
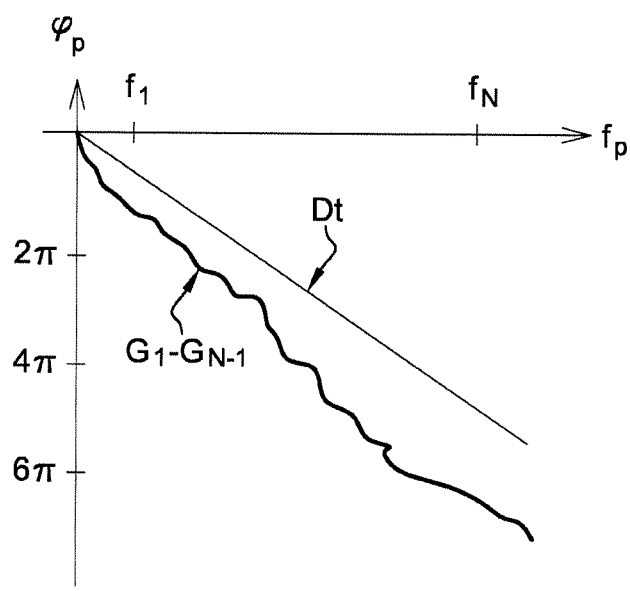
FIG. 6 shows a graph depicting the sections of FIG. 5 placed end to end.

FIG. 6 shows the segments $G_1, \ldots G_{N-1}$ of FIG. 4 placed end to end, and a theoretical straight line Dt. The theoretical straight line Dt corresponds to an ideal case in which the first signals $S_{vp}$ and second signals $S_{ip}$ transmitted between the vehicle V and the identifier I do not undergo reflection or refraction: only signals on direct paths are received by the receivers Rxv, RXi of the vehicle V and of the identifier I. In a real case, the signals received by the receivers Rxv, RXi of the vehicle V and of the identifier I are not exactly the first signals $S_{vp}$ and second signals $S_{ip}$, but accumulations of the direct signals and of the reflected/refracted signals.

Using a single gradient $P_p$ as a basis for calculating the distance R via the preceding formula therefore exhibits a non-negligible risk of error. Thus, in a step Fil_$P_p$, the N-1 calculated gradient $P_p$ values are filtered so as to determine an optimum gradient P for performing the calculation of the distance R. The filtering may for example consist in selecting the minimum gradient from among the N-1 gradients $P_p$. As an alternative, the filtering may consist in selecting a plurality of gradients from among the N-1 gradients $P_p$ (for example, account is taken only of values deemed to be incoherent as they are too different from the gradients calculated with frequencies outside of the Wi-Fi channels for example), then averaging the selected gradients. As an alternative, the filtering may consist in averaging the N-1 gradients $P_p$. Other types of filtering may of course be contemplated.

Next, in a step Cal_R, the distance R separating the vehicle V and the identifier I is calculated by the computer Xv of the vehicle V, using the following formula:

$$R=c/2\pi*P.$$

On the basis of the calculated distance R and depending on a specific requested function (opening of a door, closure of a door, starting of the vehicle, for example), the computer Xv of the vehicle V is able to determine whether or not the function should be performed.

Naturally, the steps of the method could, as an alternative, be performed in another technically feasible order than the one presented above.

The invention claimed is:

1. A method for measuring a distance separating a vehicle and an identifier for accessing and starting the vehicle, the vehicle and the identifier being synchronized, the method comprising:
  selecting N frequencies, p∈[1;N], N being a natural number at least greater than 3, between a minimum frequency and a maximum frequency;
  implementing N sequences $Sq_p$, each sequence comprising the following steps:
    transmission, from a transmitter of the vehicle to a receiver of the identifier, of a first signal of frequency $f_p$,
    measurement, by a computer of the identifier, of a phase $\phi_{vip}$, modulo $2\pi$, of the received first signal, in relation to a second signal of phase $\phi_{ip}(t)=\phi_{0ip}+2\pi f_p t$,
    transmission, from a transmitter of the identifier to a receiver of the vehicle, of the second signal,
    calculation, by a computer of the vehicle, of a phase, modulo $2\pi$, of the received second signal, in relation to the first signal;
  calculation of the average of the phase and of the phase, for each value of p between 1 and N-1, calculation of a gradient using the formula $P_p=(\phi_{p+1}-\phi_p)/(f_{p+1}-f_p)$; and
  calculation of the distance on the basis of the gradients $P_p$, p∈[1;N].

2. The method as claimed in claim 1, wherein the frequencies $f_p$ are selected, during the selection step, from among a plurality of frequencies $F_j$, $j \in [1;K]$, K being a natural number at least greater than 3, that are not situated at the center of a plurality of predetermined communication channels.

3. The method as claimed in claim 2, wherein the frequencies $F_j$ are edge frequencies of first channels of the plurality of predetermined communication channels.

4. The method as claimed in claim 3, wherein the frequencies $F_j$ are such that K=40, F1=2401 MHz and, for all values of j between 1 and 39, $F_{j+1} - F_j = 2$ MHz.

5. The method as claimed in claim 2, wherein the frequencies $F_j$ are situated outside of second channels of the plurality of predetermined communication channels.

6. The method as claimed in claim 1, wherein the second channels are Wi-Fi channels.

\* \* \* \* \*